United States Patent Office 2,846,780
Patented Aug. 12, 1958

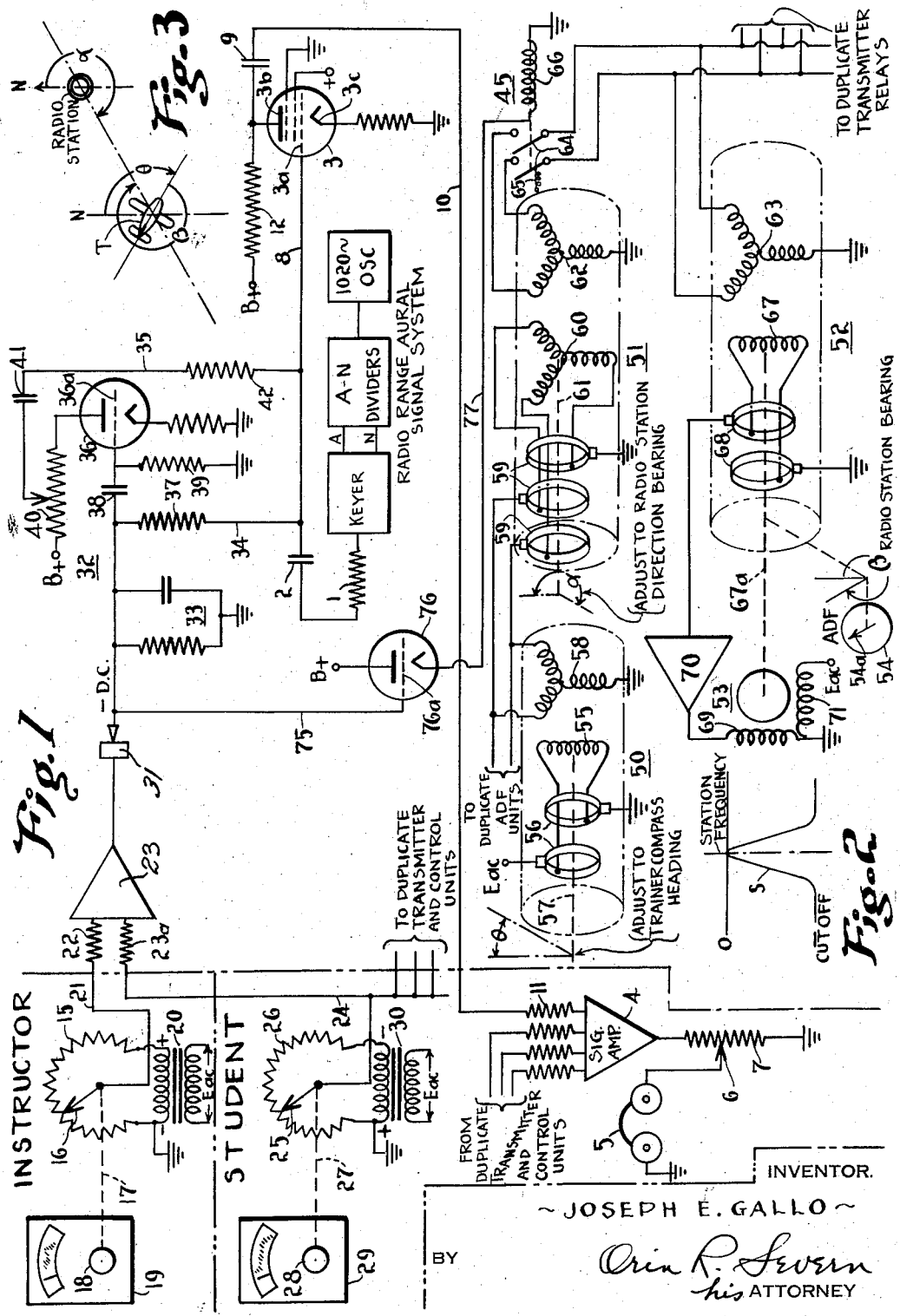

2,846,780

FLIGHT TRAINING APPARATUS FOR SIMULATING RADIO STATION TUNING

Joseph E. Gallo, Livingston, N. J., assignor to Curtiss-Wright Corporation, Propeller Div., a corporation of Delaware Continuation of application Serial No. 105,132, July 16, 1949. This application January 27, 1955, Serial No. 484,546

8 Claims. (Cl. 35—10.2)

This invention relates to apparatus used in flight trainers for simulating the transmission and reception of radio range signals, and particularly to means for simulating radio station tuning in the course of radio navigation of aircraft.

In actual flight the pilot when navigating by radio operates the tuning dial of his receiver set so as to "tune in" the particular station by which he desires to navigate. This tuning must be done carefully and accurately in order that the pilot may receive clearly the conventional radio range signals of the proper station, and also that he may obtain direction information from his automatic direction finder (ADF) or radio compass. The pilot's ground training in this phase of radio navigation is therefore important since in actual flight he is often under stress in performing his duties, as when unfavorable flight conditions exist and when many other things require close attention. For example due to the present crowded radio spectrum, it is easily possible, especially during darkness when signals are more numerous, that a pilot may tune in the wrong station and then concentrate on the A and N beam signals to such an extent that the station identification signals are not accurately noted.

Heretofore, it has been customary in the operation of grounded flight trainers having radio navigation equipment for the pilot to move a selector switch to one of a number of positions, each representing a radio station. In this method of station selection, the number of stations is not only limited by the practical size of the selector switch, but the "tuning" involves nothing more than a simple make-and-break of the signal circuit. Accordingly actual operating conditions are not simulated to the desired degree.

A principal object of the present invention therefore is to provide in a radio navigation training system improved means for simulating radio station tuning that is realistic in respect to aural and visual indications and that requires the same degree of care as in tuning actual radio equipment for the purpose of inculcating in the student pilot careful radio tuning habits.

A further and specific object of the invention is to provide improved electrical means for simulating radio station tuning arranged to vary the intensity of the simulated radio signals in accordance with the tuning operation whereby accurate tuning is necessary in order to obtain clear reception of radio range signals and information.

In accordance with the present invention, simulated station tuning by the student navigator is performed in conventional manner by adjusting the tuning dial of a simulated receiver until the proper station signal comes in clearly over the head phones. In case of inaccurate tuning, the signal is either weak or not heard, varying in degree with the amount of off-tuning as in actual practice. Where automatic direction finding equipment (ADF) is used, the direction instrument is inoperative until the station is properly tuned in. In a practical embodiment of the invention, two potentiometers representing a transmitter and a receiver are adjustable respectively by an instructor and a student navigator. The potentiometers are energized by alternating current voltages 180° out of phase, and are connected to a summing amplifier, the output of which is connected through a rectifier circuit to the radio range signal system. This rectified output is used to control an electric valve circuit that in turn controls the radio signal volume. When the potentiometer voltages are equal for corresponding adjustments of the potentiometers representing tuning of the receiver to the transmitter, the output of the summing amplifier is zero and the radio signal volume is unaffected and normal. When, however, the potentiometer voltages are unequal indicating that the student has not adjusted (tuned) his potentiometer to correspond with the instructor's potentiometer, the resultant output of the summing amplifier and rectifier circuit biases the electric valve circuit to partial or complete "cut-off" so that the student does not hear the signals distinctly, or at all, in his head set. The aural signal system is thereby disabled in the case of material off-tuning. The ADF direction instrument is sensitive to the output of the summing amplifier and rectifier through a relay that is adapted to disable the ADF system, thus indicating off-tuning.

The invention will be more fully set forth in the following description referring to the accompanying drawings and the features of novelty will be pointed out with particularity in the claims annexed to and forming a part of this specification.

Referring to the drawing, Fig. 1 is a diagrammatic and schematic illustration of an electrical system embodying the present invention for simulating radio station tuning in flight training apparatus; Fig. 2 graphically illustrates tuning control; and Fig. 3 diagrammatically illustrates bearings used in ADF simulation.

The simulated radio navigation system includes an aural signal producing system of any suitable type, such as that for producing conventional A and N radio range signals alternating with station identification signals. Apparatus for this purpose is well known in the art, an example being Dehmel Patent 2,366,603 granted January 2, 1945 for "Aircraft Training Apparatus" and a specific description thereof is therefore unnecessary. The essential parts of such a system are diagrammatically indicated in the drawing as an oscillator or signal generator OSC operable at the conventional signal frequency of 1020 cycles, a radio range signal control means designated A–N Dividers for bringing in the A and N signals according to the simulated flight position on the radio range and a coding device designated Keyer. It will be understood that the signal output may be in either code or voice depending on the system to be simulated.

The output of the aural signal system is connected through a resistance 1, condenser 2 and electronic amplifier valve 3 to a signal amplifier 4, the output of which energizes the student's headphone set 5. The student may control the received signal volume in conventional manner by adjusting the slider contact 6 on the resistor 7 in the amplifier output circuit. The valve 3 is normally biased so that in the absence of a biasing voltage from another source it transmits freely the radio range signals to the signal amplifier 4 and its gain is a maximum for this condition. The valve per se is shown as of the variable gain pentode type having a control grid 3a connected to the signal conductor 8, a plate 3b connected through a condenser 9, conductor 10 and resistance 11 to the input of the signal amplifier 4, a cathode 3c and screen and suppressor grids as indicated. The plate circuit includes a resistance 12 and is energized in conventional manner by positive D. C. potential indicated B+.

For the purpose of simulating station tuning by the student with respect to a reference transmitting station, a pair of variable electrical devices representing the reference transmitter and the student's receiver set are adjustable by an instructor and the student respectively. Such apparatus is illustrated in the sections marked "Instructor" and "Student" respectively. The instructor's apparatus comprises a potentiometer 15 having an adjustable slider contact 16 that is connected through a mechanical connection indicated at 17 to an adjusting dial 18 of a simulated frequency varying device 19. The potentiometer 15 is energized through a transformer 20 from a suitable source of alternating current $E_{ac}$. The slider contact 16 is connected by conductor 21 and resistance 22 to the input of a summing amplifier 23. The input of this amplifier is also connected through resistance 23a and conductor 24 to the slider contact 25 of the student's potentiometer 26. The student's potentiometer is similar to the instructor's potentiometer and the slider contact 25 is connected through a mechanical connection 27 to a dial 28 of a device 29 representing the student pilot's radio receiver set. The potentiometer 26 is likewise energized through a transformer 30 from a source of alternating current $E_{ac}$, the voltage being de-phased 180° by the transformer with respect to the voltage energizing potentiometer 15 as indicated. Accordingly, it will be seen that with the instructor's potentiometer 15 set at a definite point for deriving a voltage representing a given station frequency, the student's potentiometer 26 when set at a corresponding point derives a voltage of equal magnitude but opposite phase. For this condition the resultant voltage at the input of the amplifier 23 is zero and the output is accordingly zero. However if the student sets the slider contact 25 at any other point the derived voltages will be unequal in magnitude and a resultant A. C. voltage depending on the difference in settings of the potentiometers will appear at the input of the amplifier 23.

For the purpose of utilizing the resultant alternating current voltage from amplifier 23 so as to control in a realistic manner the volume of the radio range signals heard at the student's head set 5, the voltage is rectified at 31 to negative D. C. and delivered through a smoothing circuit 32 presently described to the control grid 3a of amplifier 3. This negative voltage, which is proportional to the degree of off-tuning of the student's potentiometer 26, tends to bias the amplifier toward cut-off so that in case of a small negative bias, the signals come through weakly, thus simulating slight off-tuning of the receiver. A pre-determined larger negative voltage biases the amplifier to cut-off so that no signals are heard at the head set 5.

The smoothing circuit 32 is for the purpose of precluding "hum" due to rectified current pulsations and comprises a conventional filter 33 for partial smoothing and a circuit for complete smoothing consisting of a pair of branch circuits 34 and 35 jointly interconnecting the output of the rectifier 31 and the control grid of amplifier 3. If the filter 33 were designed to eliminate all "ripple" from the rectified current at commercial frequency, the circuit would have an undesirably long time constant affecting adversely the signal system. However, it will be apparent that the filter 33 may be sufficient if a signal voltage of sufficiently high frequency be used.

For eliminating time delay where commercial frequencies are used, the branch circuit 35 is provided with an electronic valve or inverter 36 for reversing the polarity or phase of the "ripples" in that circuit whereby the current pulsations of the respective branch circuits oppose each other and the resultant voltage at the control grid of amplifier 3 is steady.

Specifically, the branch circuit 34 includes a resistance 37 and the branch circuit 35 includes a condenser 38 and a grounded resistance 39 connected to the control grid 36a of valve 36, an adjustable resistance 40 in the plate circuit for "hum" control and series-connected condenser 41 and resistance 42. The plate circuit is energized from a suitable source B+ of positive D. C. as indicated.

Operation of the aural signal system

The instructor determines the identity of a radio transmitter according to the student pilot's simulated flight position and the particular navigation problem and represents the station frequency by adjusting his potentiometer 15 to a pre-determined position representing that frequency. The student's simulated receiver is calibrated to represent the same range of station frequencies so that the student can initially set his potentiometer 26 at an approximate position representing the frequency of the reference station by which he desires to navigate. The final tuning requires precise adjustment as in practice and is graphically illustrated by Fig. 2 wherein the curve s represents with respect to negative bias the signal volume at the receiver 5 within the tuning range of the receiver. The cut-off datum line of the graph represents zero signal volume. As shown, the signal volume is maximum at tuned frequency and falls off sharply in realistic manner as the off-tuning at either side of the station frequency increases.

Summarizing, off-tuning is represented by a resultant alternating current voltage at the amplifier 23. The amplified A. C. voltage is rectified at 31 to negative value and the negative current pulsations after passing through the smoothing circuit 32 constitute a steady negative bias at the control grid of amplifier 3 for reducing or cutting off the signal current from the radio range signal system. It will thus be seen that the student can bring in clearly the radio range signals of his reference station only by careful and accurate tuning.

Simulating tuning for automatic direction finder

In addition to the radio range apparatus above referred to, most radio navigation systems include an automatic direction finder (ADF) or radio compass. This device has an indicator or pointer that in operation is continuously oriented on the bearing of the reference radio station with respect to the nose of the aircraft. This direction data is obtained only when the pilot's receiver is accurately tuned to the aforesaid reference station. For simulating this tuning operation, the simulated transmitter and receiver apparatus operable by the instructor and student respectively and the amplifier 23 and rectifier 31 are used in the manner above described. In the present case, however, the negative voltage from the rectifier 31 is used to control a relay 45 for disabling the simulated automatic direction finder system.

The ADF system per se is not part of the present invention and by way of example an induction system is illustrated. This system is adjustable according to operation of conventional grounded training apparatus such as that disclosed in the aforesaid Dehmel Patent 2,366,603. The ADF apparatus includes essentially a pair of interconnected rotary transformers 50 and 51, each having relatively movable windings adjustable according to angles $\theta$ and $\alpha$ respectively as indicated. The angle $\theta$ represents the trainer compass heading and the angle $\alpha$ represents the bearing of the simulated flight position from the radio station. The resultant output of the rotary transformers 50 and 51 energizes a third rotary transformer 52 that controls a servo motor 53 for positioning the ADF indicator 54.

Specifically, the rotary transformer 50 comprises a rotatable single phase primary winding 55 connected through slip rings 56 to a source of alternating current $E_{ac}$. The coil is operatively connected to a shaft indicated at 57 that is adjustable through an angle $\theta$ as indicated according to the trainer compass heading. Such an adjustment for example may be made from the shaft 61 operated from the steering motor SM, Figs. 1, 2 and 23, of the aforesaid Dehemel patent. The winding 55 is inductively related to a relatively fixed Y-connected secondary winding 58, the induced voltage output of which energizes through slip rings 59 a similar Y-connected winding 60 of the rotary transformer 51. The winding 60 is rotatable as indicated by means of a shaft 61 that is adjustable to an angle α representing the bearing of the simulated instant flight position from the reference radio station. This adjustment may be made from the shaft 102 of the signal controller, Fig. 8, of the aforesaid Dehmel patent. The winding 60 is inductively related to a relatively fixed Y-connected secondary winding 62. The induced voltage of winding 62 energizes the corresponding Y-connected winding 63 of the rotary transformer 52 when the switch contacts 64 of the relay 45 are closed for orienting the ADF indicator. This switch is normally biased by a spring 65 to open position so as to disable the ADF system and is closed in response to pre-determined energization of the relay coil 66 in a manner presently described.

The rotary transformer 52 comprises a Y-connected primary winding 63 above referred to and a relatively rotatable single phase secondary winding 67 that is connected through slip rings 68 to the positioning servo 53. The secondary winding 67 is automatically positioned by the servo at a null-voltage point; i. e., the winding is oriented through a mechanical connection 67a with the servo 53 until the resultant of the induced voltages in the winding is zero. The ADF instrument 54 is also operated through the connection 67a simultaneously with rotation of winding 67. Specifically, the control winding 69 of the servo is energized through amplifier 70 by voltage from the winding 67 and the reference voltage winding 71 is polarized in well-known manner so that the servo when energized rotates the winding 67 in a direction to decrease the coil voltage. Accordingly, the servo is deenergized when the coil 67 is brought to the null position.

It will be seen from the relationship of the rotary transformers that when the shafts 57 and 61 are adjusted according to the angles θ and α respectively, the shaft 67a assumes an angular position representing the difference between said angles, i. e. (α−θ), when the coil 67 is oriented at the null position. This null position relative to a reference position represents the angle β, i. e. the radio station bearing as indicated by instrument 54.

The relationship of the various bearing angles is diagrammatically illustrated by Fig. 3 the instant flight position of the trailer being indicated at T. The trainer compass heading is indicated by the angle θ and the direction bearing of the reference radio station from the trainer is indicated by angle β, the reference direction here being the longitudinal axis of the trainer. The angle α represents the bearing of the trainer flight position from the radio station. Accordingly, it will be seen upon inspection that $$\alpha - \theta = \beta - 180°$$

therefore the actual bearing β of the radio station relative to the nose of the trainer T is the angle (α−θ+180°). The pointer element 54a is preset 180° with respect to its zero reference position in order that the angle β, instead of angle (β−180°) may be directly read on the azimuth scale of the indicator 54. The reason for this 180° adjustment will be apparent from the fact that the angle α is taken from the radio station to the flight position rather than from the trainer position, thus representing a shift of 180°.

The ADF indicating system is controlled by the relay 45 in the following manner: the relay coil 66 is connected to the output of rectifier 31 through conductor 75, amplifier 76 and conductor 77. The control grid 76a of the amplifier is connected to conductor 75 and the amplifier is biased so that the tube conducts when the grid potential is zero. For this condition the relay coil is energized and closes the contacts 64 against the bias of spring 65 so that the rotary transformer 52 is electrically connected to the output of the rotary transformer 51. Negative voltage on the grid biases the amplifier toward cut-off, thus de-energizing the relay and causing opening of the contacts 64 under bias of spring 65 and consequent disabling of the ADF indicating apparatus including the rotary transformer 52 and ADF indicator 54. Accordingly, it will be seen that the ADF system is disabled as a result of negative voltage produced by off-tuning and therefore that precise tuning for ADF operation is necessary as in the case of radio range signal reception.

The above described apparatus illustrates but a single simulated transmitter and ADF unit in the interest of simplicity. However, it will be apparent that duplicate apparatus as indicated may be readily provided for simulating radio navigation with respect to a plurality of radio reference stations and for simulating well-known practice such as dual ADF operation for determining a "fix" etc. For example, where a plurality of stations are simulated, the student's potentiometer may be connected as indicated to duplicate summing amplifiers similar to amplifier 23 to which the various duplicate instructor-operated potentiometers simulating the respective stations are also connected. These duplicate equipments would have separate inputs respectively at the student's signal amplifier 4 as indicated. In the case of dual ADF equipment, the same rotary transformer 50 is used and duplicate disabling relays and rotary transformers 51 are used with each simulated transmitter unit as indicated.

It should be understood that this invention is not limited to specific details of construction and arrangement thereof herein illustrated and that changes and modifications may occur to one skilled in the art without departing from the spirit of the invention.

This application is a continuation of my application S. N. 105,132, filed July 16, 1949, now abandoned.

What I claim is:

1. In a training system for radio navigation having means for continuously generating simulated radio range signals and means for receiving said signals by a student, means for simulating radio station tuning by a navigator comprising variable electrical means representing a transmitter adjustable to a plurality of predetermined settings by an instructor for representing a given range of station frequencies respectively, and a second variable electrical means representing a receiver independently adjustable to a similar plurality of settings by a student for representing the same range of station frequencies, additional means responsive jointly to said instructor's and student's variable electrical means for producing an electrical control quantity according to a difference in said adjustments, said control quantity being a minimum for corresponding settings of said variable means representing a tuned condition of the receiver and transmitter, and additional electrical means responsive to said control quantity for controlling the transmission of said radio range signals from said generating means to said receiving means according to the difference in settings of said variable electrical means in simulation of off-tuning.

2. In a training system for radio navigation having means for aural simulation of radio range signal reception including a signal source and a signal receiver means for simulating radio station tuning by a navigator comprising variable electrical means representing a transmitter adjustable to a plurality of predetermined settings by an instructor for representing a given range of station frequencies respectively, and a second variable electrical means representing a receiver independently adjustable to a similar plurality of settings by a student for representing the same range of station frequencies, means jointly responsive to both said variable electrical means for producing an electrical control quantity according to a difference in said adjustments in simulation of off-tuning, said control quantity being a minimum for corresponding settings of said variable means representing a tuned condition of the receiver and transmitter, and additional electrical means responsive to said control quantity according to the magnitude thereof for controlling the transmission of said signal so as to decrease the volume of the received radio range signals according to increase in difference in settings of said variable electrical means.

3. In a training system for radio navigation having means for generating radio range signals and means for receiving said signals by a student simulating the reception of direction data from a reference radio station, means for modifying the operation of said reception simulation means, means for simulating radio station tuning by a navigator comprising adjustable electrical means representing a radio transmitter operable by an instructor for deriving a reference voltage representing a given station frequency, a second adjustable electrical means representing a radio receiver operable by a student for deriving a second voltage opposite in sense to said reference voltage, said derived voltages when equal in magnitude representing a tuned condition of the transmitter and receiver, and additional electrical means jointly responsive to said derived voltages for producing a resultant control voltage varying in magnitude according to the difference between said derived voltages, said modifying means being responsive to said resultant voltage when an off-tuned condition is represented for causing disabling of said reception simulating means.

4. In a training system for radio navigation having means for simulating the reception of radio signals from a reference radio station, means for simulating radio station tuning by a navigator comprising potentiometer means representing a radio transmitter adjustable by an instructor for deriving a reference alternating current voltage representing a given station frequency, potentiometer means representing a radio receiver adjustable by a student for deriving an alternating current voltage of opposite phase relation, said derived voltages when equal in magnitude representing a tuned condition of the transmitter and receiver, electrical summing means jointly energized by said derived voltages for producing a resultant voltage, a rectifying circuit energized by said resultant voltage, and electronic valve means for modifying and controlling said reception simulating means, said electronic valve means being responsive to said rectifying circuit for causing the volume of said signals to decrease according to increase in the magnitude of said resultant voltage representing off-tuning.

5. In a radio navigation training system for simulating radio station tuning, means for producing aural signals, means for receiving said signals, electronic valve means interconnecting said signal producing and receiving means and normally biased for clear transmission of said signals, a pair of voltage deriving means representing a simulated transmitter and receiver operable by an instructor and student respectively for jointly producing an alternating current voltage variable in magnitude according to simulated off-tuning of said receiver and transmitter, a rectifier for said voltage, a smoothing circuit connected between said rectifier and said electronic valve, said valve means being biased toward cutoff in response to voltage output from said smoothing circuit according to the magnitude thereof whereby the volume of said aural signals is decreased in accordance with simulated station off-tuning.

6. In a training system for radio navigation having simulated automatic direction finder indicating means for simulating reception of direction data from a reference radio station, means for simulating radio station tuning by a navigator comprising electrical means representing a radio transmitter adjustable by an instructor for deriving a voltage representing the frequency of said reference station, electrical means representing a radio receiver and adjustable by a student for deriving a voltage of opposite polarity, summing means for said voltages, said derived voltages when equal in magnitude for corresponding settings of said deriving means representing a tuned condition of said receiver and transmitter, and electronic means including a relay responsive to a predetermined difference in magnitude between said voltages for disabling said automatic direction finder means thereby representing off-tuning.

7. In a radio navigation training system for simulating radio station tuning, means for producing aural signals, means for receiving said signals, electronic valve means inter-connecting said signal producing and receiving means and normally biased for clear transmission of said signals, a pair of voltage deriving means representing respectively simulated transmitter and receiver apparatus operable by an instructor and student respectively for producing a pair of alternating current voltages oppositely phased with respect to each other, a summing amplifier for said voltages, a tuned condition of the transmitter and receiver being represented when said voltages are equal and the amplifier output is zero, and rectifying means responsive to the amplifier output for producing a direct current component, said electronic valve means being responsive to said direct current component so that it is biased toward cut-off according to the magnitude thereof for disabling said aural signals thereby representing off-tuning.

8. In a radio navigation training system for simulating radio station tuning, means for producing visual signals including a simulated automatic direction finder indicator, means for producing aural signals, means for receiving said signals, electronic valve means inter-connecting said signal producing and receiving means and normally biased for clear transmission of said signals, a pair of voltage deriving means representing respectively simulated transmitter and receiver apparatus operable by an instructor and student respectively for producing a pair of alternating current voltages oppositely phased with respect to each other, a summing amplifier for said voltages, a tuned condition of the transmitter and receiver being represented when said voltages are equal and the amplifier output is zero, rectifying means responsive to the amplifier output for producing a direct current component, said electronic valve means being responsive to said direct current component so that it is biased toward cut-off according to the magnitude thereof for disabling said aural signals, and means including a relay also responsive to said direct current component for disabling said automatic direction finder indicator, thereby representing off-tuning.

References Cited in the file of this patent

UNITED STATES PATENTS

| | | |
|---|---|---|
| 2,321,799 | Cone, Jr. et al. | June 15, 1943 |
| 2,485,331 | Stuhrman et al. | Oct. 18, 1949 |
| 2,516,780 | Ludwig | July 25, 1950 |
| 2,559,039 | Decker | July 3, 1951 |